United States Patent

[11] 3,625,987

[72] Inventor Adolf Hubele
    Riehen, Switzerland
[21] Appl. No. 681,101
[22] Filed Nov. 7, 1967
[45] Patented Dec. 7, 1971
[73] Assignee Ciba Limited
    Basel, Switzerland
[32] Priority Nov. 10, 1966
[33] Switzerland
[31] 16259/66

[54] CYANO CARBAMOYLOXIMES
    11 Claims, No Drawings

[52] U.S. Cl.................................................. 260/465 D,
    71/88, 71/92, 71/94, 71/95, 71/105, 260/239 R,
    260/247.2, 260/268 CN, 260/294, 260/326.3,
    260/455 C, 260/464, 260/465.4, 424/244,
    424/248, 424/250, 424/267, 424/274, 424/304
[51] Int. Cl....................................................... C07c 121/40,
    C07c 121/46, C07c 121/60
[50] Field of Search.......................................... 260/464,
    465 D, 465.4

[56] References Cited
    UNITED STATES PATENTS
    2,925,434  2/1960  Parker........................ 260/465
    3,256,330  6/1966  Kilsheimer et al............ 260/464 X
    3,328,457  6/1967  Payne, Jr...................... 260/464
    3,466,316  9/1969  Payne, Jr. et al............. 260/465.4

Primary Examiner—Charles B. Parker
Assistant Examiner—Dolph H. Torrence
Attorneys—Harry Goldsmith, Joseph G. Kolodny and Bryant W. Brennan ABSTRACT: The present invention relates to carbamates of the general formula

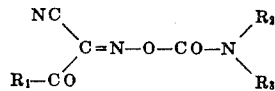

in which $R_1$ represents an alkoxy, aralkoxy, cycloalkoxy, aryloxy, alkylthio, aralkylthio, cycloalkylthio or arylthio radical, or in which $R_1$ represents a secondary or tertiary amido group, $R_2$ represents a hydrogen atom or a lower aliphatic radical and $R_3$ represents a hydrogen atom, a lower aliphatic radical or an unsubstituted or substituted aryl radical.

These compounds can be prepared by reaction of a cyanacetic acid ester or cyanacetic acid amide with an agent yielding nitrous acid and further reaction of the resulting oxime with either an isocyanate or a carbamic acid halide. The resulting carbamates are advantageously used as active substances for combating various kinds of pests, especially in preparaions for combating bacteria and fungi affecting animals and plants. Those separations may comprise, if desired, other known additives and pesticides.

CYANO CARBAMOYLOXIMES

The present invention provides pesticidal preparations containing as active ingredient at least one carbamate of the general formula $$\begin{array}{c} NC \\ \diagdown \\ R_1-C \\ \parallel \\ O \end{array} C=N-O-\underset{\underset{O}{\parallel}}{C}-N\begin{array}{c} R_2 \\ \diagup \\ \diagdown R_3 \end{array} \quad (I)$$

in which $R_1$ represents an alkoxy, aralkoxy, cycloalkoxy, aryloxy, alkylthio, aralkylthio, cycloalkylthio or arylthio residue, or in which $R_1$ represents a secondary or tertiary amido group, $R_2$ represents a hydrogen atom or a lower aliphatic residue and $R_3$ represents a hydrogen atom or a lower aliphatic residue or an unsubstituted or substituted aryl residue, if desired in admixture with a suitable carrier. The term "suitable carrier" refers to carriers in the widest sense, for example, solvents, diluents, emulsifiers, dispersants, bonding agents, adhesives and thickeners.

The preparations of the present invention may contain the active ingredient of the formula (I) either alone or in admixture with one or more other known pesticides and/or herbicides.

When $R_1$ represents a secondary amido group, the substituent may be of an aliphatic, araliphatic or aromatic nature.

An aliphatic residue may be, for example, an alkyl, alkenyl, alkinyl, alkoxyalkyl, alkylthioalkyl, halogenalkyl, cyanoalkyl or a carbalkoxyalkyl group. An araliphatic or aromatic residue may be unsubstituted or contain one or more substituents, for example, lower alkyl, alkoxy, alkylthio, alkylsulphinyl, alkylsulphonyl groups, cyano, nitro or trifluoromethyl groups, lower dialkylamino groups and especially halogen atoms.

The substituents may also be present when $R_3$ is a substituted aromatic radical.

The present invention especially provides pesticidal preparations containing as active ingredient at least one carbamate of the general formula $$\begin{array}{c} NC \\ \diagdown \\ R_1-C \\ \parallel \\ O \end{array} C=N-O-\underset{\underset{O}{\parallel}}{C}-N\begin{array}{c} R_2 \\ \diagup \\ \diagdown R_3 \end{array} \quad (Ia)$$

in which $R_1$ represents an alkoxy, aralkoxy, cycloalkoxy or aryloxy group or a mono- or dialkylamido group, or an arylamido group which may be substituted by halogen atoms, $NO_2$, $CF_3$ and/or a methyl group, or $R_1$ represents a pyrrolidino, piperidino, morpholino, N'-alkylpiperazino or N-azepino group, $R_2$ represents a hydrogen atom or a lower alkyl radical and $R_3$ a lower alkyl or halogen-alkyl radical or a phenyl radical which may be substituted by one or more halogen atoms, especially chlorine atoms, or by one or more alkyl, alkoxy, nitro and/or trifluoromethyl groups.

The new carbamates of the formula (I) and (Ia) are distinguished by especially valuable biological activities. For example, they act as microbicides, especially against bacteria and fungi affecting humans, animals and plants. Furthermore, they have an insecticidal and acaricidal effect and, when used in high concentrations, a herbicidal effect.

They further act against pests that infest waters or muddy moist soil, for example, algae, Sedentaria, Myxobacteria etc. and also molluscs. The following compounds are distinguished by a distinctly strong effect against *phytopathogenic fungi*, for example, *Alternaria solani, Septoria apii, Erysiphe*, phytopathogenic bacteria and other pests:

(a) $CH_3OOC-\underset{\underset{CN}{\mid}}{C}=N-O-\underset{\underset{O}{\parallel}}{C}-NH-\langle\!\!\langle\rangle\!\!\rangle-Cl$ (with $CF_3$)

(b) $C_2H_5OOC-\underset{\underset{CN}{\mid}}{C}=N-O-\underset{\underset{O}{\parallel}}{C}-NH-\langle\!\!\langle\rangle\!\!\rangle-Cl$ (with $CF_3$)

(c) $C_2H_5OOC-\underset{\underset{CN}{\mid}}{C}=N-O-\underset{\underset{O}{\parallel}}{C}-NH-\langle\!\!\langle\rangle\!\!\rangle-CF_3$ (with $CF_3$)

(d) $CH_3OOC-\underset{\underset{CN}{\mid}}{C}=N-O-\underset{\underset{O}{\parallel}}{C}-NH-\langle\!\!\langle\rangle\!\!\rangle-Cl$ (with Cl)

(e) $CH_3OOC-\underset{\underset{CN}{\mid}}{C}=N-O-\underset{\underset{O}{\parallel}}{C}-NH-\langle\!\!\langle\rangle\!\!\rangle-Cl$ (f) $\langle N\rangle-CO-\underset{\underset{CN}{\mid}}{C}=N-O-\underset{\underset{O}{\parallel}}{C}-NH-\langle\!\!\langle\rangle\!\!\rangle-Cl$ (with Cl)

(g) $\langle H\rangle-O-OC-\underset{\underset{CN}{\mid}}{C}=N-O-\underset{\underset{O}{\parallel}}{C}-NH-\langle\!\!\langle\rangle\!\!\rangle-Cl$ (h) $(CH_3)_2N-CO-\underset{\underset{CN}{\mid}}{C}=N-O-\underset{\underset{O}{\parallel}}{C}-NH-\langle\!\!\langle\rangle\!\!\rangle-Cl$ (with Cl)

The present invention also provides carbamates of the general formula $$\begin{array}{c} NC \\ \diagdown \\ R_1-C \\ \parallel \\ O \end{array} C=N-O-\underset{\underset{O}{\parallel}}{C}-N\begin{array}{c} R_2 \\ \diagup \\ \diagdown R_3 \end{array} \quad (I)$$

in which $R_1$ represents an alkoxy, aralkoxy, cycloalkoxy, aryloxy, alkylthio, aralkylthio, cycloalkylthio or arylthio residue, or in which $R_1$ represents a secondary or teriary amido group, $R_2$ represents a hydrogen atom or a lower aliphatic residue, and $R_3$ represents a hydrogen atom or an aliphatic residue or an unsubstituted or substituted aryl radical.

The present invention also provides a process for preparing the carbamates of the formula I and Ia, wherein a cyanacetic ester or a cyanacetamide of the formula $$\begin{array}{c} NC \\ \diagdown \\ R_1-C \\ \parallel \\ O \end{array} CH_2 \quad (II)$$

in which $R_1$ has the meaning defined above, is oximated with nitrous acid or an agent giving nitrous acid, and the resulting oximino compound of the formula $$\begin{array}{c} NC \\ \diagdown \\ R_1-C \\ \parallel \\ O \end{array} C=NOH \quad (III)$$

is reacted either with an isocyanate of the formula $$O=C=N-R_3 \quad (IV)$$

so that $R_2$ corresponds to a hydrogen atom or with a carbamic acid halide of the formula $$Hal-\underset{\underset{O}{\parallel}}{C}-N\begin{array}{c} R_2 \\ \diagup \\ \diagdown R_3 \end{array} \quad (V)$$

in which $R_2$ and $R_3$ have the above meanings and Hal is a halogen atom, preferably a chlorine atom.

The oximation of a cyanacetic acid derivative of the formula (II) may be carried out, for example, with an alkali metal nitrite in an aqueous acetic acid solution.

When $R_1$ in the formula (II) represents, for example, a phenoxy residue, it is advantageous to perform the oximation under rather mild conditions, for example, with butylnitrite or amylnitrite in an organic solution. Examples of suitable organic solvents are ether and ethyl acetate.

The reaction of the oximino compound of the formula (III) with an isocyanate of the formula (IV) is advantageously carried out in an organic solvent that is free from hydroxyl groups, for example, acetonitrile, benzene, toluene and xylene. To accelerate the addition, a catalytic amount of a tertiary base, for example, triethylamine or triethylenediamine, may be added.

The reaction of the oximino compound of the formula (III) with a carbamic acid halide of the formula (V) is carried out in a similar manner, advantageously at a relatively low temperature, using an alkali metal salt of (III) as starting compound.

The following examples illustrate the invention. Unless stated as being parts by volume, the parts are parts by weight.

EXAMPLE 1

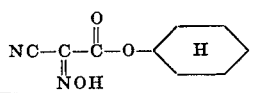

While cooing with ice and stirring a mixture of 1060 parts of cyanacetic acid cylohexyl ester and 500 parts of sodium nitrite in 600 parts by volume of water, 480 parts of glacial acetic acid are stirred in dropwise during 15 minutes, during which period the temperature rises to 40° C. After 3 hours, the whole is diluted with ice water, acidified with dilute hydrochloric acid and extracted with ether, dried and evaporated and the residue is recrystallized from xylene. The product melts at 103°–104° C.

EXAMPLE 2

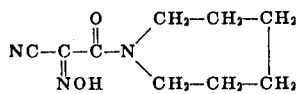

432 Parts of glacial acetic acid are dropped during one-half hour at 40° C. into 753 parts of cyanacetic acid hexamethyleneimide and 477 parts of sodium nitrite in 1500 parts by volume of water. After 6 hours, the whole is diluted with ice water, acidified with hydrochloric acid, filtered and recrystallized from ethanol. The product melts at 165°–167° C. with decomposition.

EXAMPLE 3

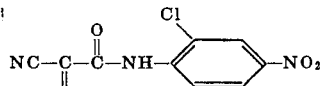

360 Parts of glacial acetic acid are added during 5 minutes at 35° C. to 800 parts of cyanacetic acid-[2-chloro-4-nitranilide] and 300 parts of sodium nitrite in 1500 parts by volume of water and 2000 parts by volume of dioxan. After 10 minutes the temperature of the solution reaches 40° C. and the solution is maintained at this temperature by cooling. AFter 4 hours the whole is diluted with ice water, acidified with hydrochloric acid, filtered and rinsed with water. The product melts at 213°–214° C. with decomposition.

EXAMPLE 4

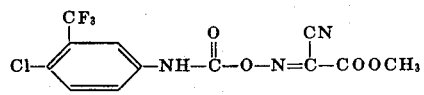

128 Parts of oximino-cyanacetic acid methyl ester and 222 parts of 4-chloro-3-trifluoromethylphenylisocyanate are dissolved at 20° C. in 200 parts by volume of acetonitrile and 800 parts by volume of toluene. The reaction is triggered off by adding one part of triethylenediamine. After 12 hours the whole is diluted with petroleum ether (50°–70° C), cooled and filtered. The product, Compound No. 1, melts at 162°–163° C.

EXAMPLE 5

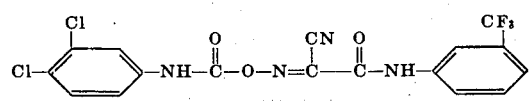

64.3 Parts of oximino-cyanacetic acid-[3-trifluoromethylanilide] and 47 parts of 3,4-dichlorophenylisocyanate are dissolved at 20° C. in 30 parts by volume of acetonitrile and 300 parts by volume of toluene. 0.5 Part of triethylenediamine is added, the whole heated for 2 minutes at 40° C., then kept for 12 hours at 20° C., diluted with petroleum ether, cooled and filtered. The product, Compound No. 2, melts at 160°–161° C. with decomposition.

EXAMPLE 6

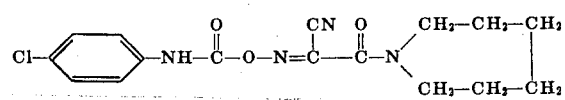

39 Parts of oximino-cyanacetic acid-hexamethyleneimide and 30.7 parts of 4-chlorophenylisocyanate are dissolved at 20° C. in 10 parts by volume of acetonitrile and 400 parts by volume of toluene. 0.5 part of triethylenediamine is added, the whole heated for 2 minutes at 50° C, then kept for 12 hours at room temperature, cooled, filtered and recrystallized from acetonitrile. The product, Compound No. 3, melts at 125°–127° C.

In an identical manner, the following carbamates of the general formula (I) can be manufactured:

| ($R_2$=H) Compound No. | $R_1$ | $R_3$ | M.P., ° C. |
|---|---|---|---|
| 4 | —OC$_2$H$_5$ | ![CF$_3$, Cl phenyl] | 141–142 |
| 5 | Same as above | ![Cl, Cl phenyl] | 160–161 |
| 6 | do | ![phenyl] | 130–132 |

| (R₂=H) Compound No. | R₁ | R₃ | M.P., °C. |
|---|---|---|---|
| 7 | do | —C₆H₄—NO₂ | 145–147 |
| 8 | do | —C₆H₄—Cl | 139–141 |
| 9 | do | —C₆H₄—O—CH₂—CH(CH₃)₂ | 127–128 |
| 10 | do | —C₆H₃(CF₃)₂ | 155–157 |
| 11 | do | —C₆H₄—CF₃ | 117–119 |
| 12 | do | —CH₃ | 104–106 |
| 13 | do | —CH₂—CH₂—Cl | 73–75 |
| 14 | —OCH₃ | —C₆H₄—CF₃ | 147–148 |
| 15 | Same as above | —C₆H₅ | 149–150 |
| 16 | do | —C₆H₄—NO₂ | 166–167 |
| 17 | do | —C₆H₄—O—CH₂—CH(CH₃)₂ | 127–128 |
| 18 | do | —CH₃ | 122–123 |
| 19 | do | —C₆H₄—Cl | 162–163 |
| 20 | do | —C₆H₃(Cl)₂ | ¹ 162–163 |
| 21 | do | —C₆H₄—Cl | 157–158 |
| 22 | —C(CH₃)OH—CH₂—CH₃ | Same as above | 128–130 |
| 23 | —O—CH(CH₃)—CH₂—CH₃ | —C₆H₃(Cl)₂ | 140–141 |
| 24 | Same as above | —C₆H₃(Cl)(CF₃) | 126–127 |
| 25 | do | —CH₃ | 80–81 |
| 26 | —O—C₆H₁₁ | —C₆H₃(Cl)₂ | 141–142 |
| 27 | Same as above | —C₆H₃(Cl)(CF₃) | 131–132 |
| 28 | do | —C₆H₃(Cl)₂ | 162–163 |

| (R₂=H) Compound No. | R₁ | R₃ | M.P., °C. |
|---|---|---|---|
| 29 | do | —CH₃ | 99–101 |
| 30 | —N(CH₃)₂ | 3,4-Cl,Cl-phenyl | 153–154 |
| 31 | Same as above | 3-Cl,4-CF₃-phenyl | 154–156 |
| 32 | —NH—C₆H₄—CF₃ | phenyl | [1] 161–163 |
| 33 | Same as above | 4-Cl-phenyl | [1] 178–180 |
| 34 | do | 3-Cl,4-CF₃-phenyl | [1] 167–169 |
| 35 | —NH—C₆H₃(Cl)(Cl) (2,4-diCl) | phenyl | [1] 177–179 |
| 36 | Same as above | 4-Cl-phenyl | [1] 170–172 |
| 37 | do | 3,4-Cl,Cl-phenyl | [1] 173–176 |
| 38 | do | 3-Cl,4-CF₃-phenyl | [1] 160–162 |
| 39 | piperidino (—N,H ring) | phenyl | 143–144 |
| 40 | Same as above | 4-Cl-phenyl | 142–144 |
| 41 | do | 3-Cl,4-CF₃-phenyl | [1] 138–140 |
| 42 | do | —CH₃ | [1] 111–113 |
| 43 | hexamethyleneimino (—N,H 7-ring) | phenyl | 124–125 |
| 44 | Same as above | 3,4-Cl,Cl-phenyl | 155–157 |
| 45 | do | 3-Cl,4-CF₃-phenyl | [1] 143–145 |
| 46 | do | —CH₃ | [1] 89–90 |
| 47 | morpholino (—N,H,O ring) | 3-Cl-phenyl | [1] 159–161 |
| 48 | Same as above | 4-CF₃-phenyl | 130–132 |
| 49 | do | 3-Cl,4-CF₃-phenyl | 176–178 |
| 50 | CH₃O— | 3-Cl-phenyl | 136–138 |

| (R₂=H) Compound No. | R₁ | R₃ | M.P., °C. |
|---|---|---|---|
| 51 | Same as above | —C₆H₄—CF₃ | [1] 139–140 |
| 52 | do | —C₆H₃(Cl)(Br) | 170–171 |
| 53 | do | —C₆H₃(Cl)(Cl) | 164–165 |
| 54 | do | —C₆H₃(CH₃)(Cl) | 118–120 |
| 55 | do | —C₆H₃(Cl)(CH₃) | 119–120 |
| 56 | do | —C₆H₃(CH₃)(Br) | 134–135 |
| 57 | do | —C₆H₃(CH₃)(CH₃) | 115–117 |
| 58 | do | —C₆H₃(NO₂)(Cl) | [1] 165–166 |
| 59 | do | —C₆H₂(Cl)(Cl)(Cl) | 143–145 |
| 60 | do | —CH₂—CH₂Cl | 72–74 |
| 61 | C₂H₅O— | —C₆H₄—Cl | 81–83 |
| 62 | Same as above | —C₆H₄—Cl | 156–157 |
| 63 | do | —C₆H₄—CF₃ | 136–137 |
| 64 | do | —C₆H₄—CH₃ | 121–122 |
| 65 | do | —C₆H₃(Cl)(Cl) | 136–137 |
| 66 | do | —C₆H₃(NO₂)(Cl) | 133–134 |
| 67 | do | —C₆H₃(Cl)(CH₃) | 90–91 |
| 68 | do | —C₆H₂(Cl)(Cl)(Cl) | 137–139 |
| 69 | CH₃—CH₂—CH(CH₃)O— | —C₆H₄—CF₃ | 93–95 |

| (R₂=H) Compound No. | R₁ | R₃ | M.P., °C. |
|---|---|---|---|
| 70 | Same as above | 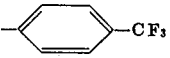 —C F₃ | 109–110 |
| 71 | do | 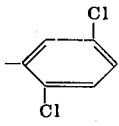 (Cl, Cl) | 100–101 |
| 72 | do | —CH₂—CH₂Cl | 57–59 |
| 73 | CH₃—(CH₂)₁₅O— | 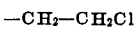 —Cl | 100–103 |
| 74 | CH₃(CH₂)₁₅O— |  —CF₃ | 96–98 |
| 75 | Same as above |  —CF₃ | 106–107 |
| 76 | do | 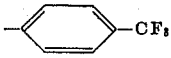 (Cl, Cl) | ¹ 110–112 |
| 77 | CH₂=CH—CH₂O— | 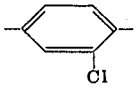 | 103–105 |
| 78 | CH₂=CH—CH₂O— |  —Cl | 118–120 |
| 79 | Same as above | 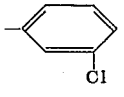 —Cl | 131–132 |
| 80 | do | 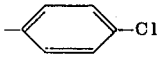 —CF₃ | 106–107 |
| 81 | do | 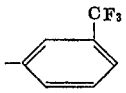 —CF₃ | 121–123 |
| 82 | do |  (Cl, Cl) | 126–127 |
| 83 | CH₂=CH—CH₂—O— | 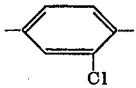 (Cl, Cl) | 130–131 |
| 84 | CH₂=CH—CH₂O— | 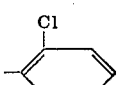 (Cl, Cl, Cl) | 124–126 |
| 85 | Same as above | —CH₂—CH₂Cl | 61–63 |
| 86 | 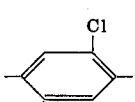 H—O— | 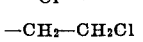 —CF₃ | 94–96 |
| 87 | Same as above | 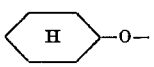 (Cl, Cl, Cl) | 124–126 |
| 88 |  —CH=CH—CH₂O— | 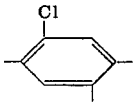 —Cl | ¹ 136 |
| 89 | Same as above | 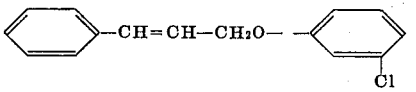 (Cl, Cl) | ¹ 137–138 |

| (R₂=H) Compound No. | R₁ | R₃ | M.P., °C. |
|---|---|---|---|
| 90 | do | 3,4,5-trichlorophenyl (Cl, Cl, Cl) | [1] 161 |
| 91 | —HN-phenyl (piperidinyl-type) | 2-chlorophenyl | 120–123 |
| 92 | Same as above | 4-CF₃-phenyl | 160–162 |
| 93 | do | Same as above | 133–135 |
| 94 | do | 3,4-dichlorophenyl | 153–154 |
| 95 | do | 2-Cl, 4-NO₂-phenyl | [1] 164–165 |
| 96 | do | 3,4,5-trichlorophenyl | 143–145 |
| 97 | 2,4-Cl₂-C₆H₃-NH— | 3-Cl-phenyl | 153–154 |
| 98 | Same as above | 4-CF₃-phenyl | [1] 164–165 |
| 99 | do | 4-CH₃-phenyl | [1] 151–152 |
| 100 | do | 2,4-Cl₂-phenyl | [1] 184–185 |
| 101 | do | 2-CH₃, 4-Cl-phenyl | [1] 153–154 |
| 102 | do | 3-CH₃, 4-Cl-phenyl | [1] 139–140 |
| 103 | do | 3,4,5-trichlorophenyl | [1] 171–172 |
| 104 | 3,5-(CF₃)₂-C₆H₃-NH— | 2-Cl-phenyl | [1] 164–165 |
| 105 | Same as above | 4-Cl-phenyl | [1] 178–179 |
| 106 | do | 4-CF₃-phenyl | [1] 187–188 |
| 107 | 4-O₂N-, 2-Cl-C₆H₃-NH— | 4-Cl-phenyl | [1] 185–187 |
| 108 | Same as above | 4-CF₃-phenyl | [1] 197–198 |

| (R₂=H) Compound No. | R₁ | R₂ | R₃ | M.P., °C. |
|---|---|---|---|---|
| 109 | O₂N—(C₆H₃Cl)—NH— | H | —(C₆H₃Cl)—Cl | ¹ 196-198 |
| 110 | O₂N—(C₆H₃Cl)—NH— | H | —(C₆H₃Cl)—NO₂ | ¹ 184-185 |
| 111 | CH₃—(C₆H₂Br₂)—NH— | H | —(C₆H₃Cl)—Cl | ¹ 120 |
| 112 | CH₃O— | CH₃— | CH₃— | 105-106 |
| 113 | (piperidinyl with H N—) | CH₃— | CH₃— | 104-105 |
| 114 | (Cl, CH₃)C₆H₃—NH— | CH₃— | CH₃— | ¹ 163-164 |
| 115 | CF₃—C₆H₄—NH— | CH₃— | CH₃— | 115-117 |
| 116 | (Cl,Cl)C₆H₃—NH— | CH₃— | CH₃— | 162-164 |
| 117 | CH₂—CH₂—CH₂\\N—/CH₂—CH₂—CH₂ | CH₃— | CH₃— | 71-72 |

¹ Decomp.

EXAMPLE 7

A. A spray of the following composition was manufactured:
 250 g. of compound No. 1
 502.5 g. of chalk
 165 g. of purified sulfite cellulose waste liquor (peridan NH₄, is a registered trademark)
 67.5 g. of sodium methylene-bis-naphthalenedisulphonate
 15 g. of a condensation product of 1 mol of p-tertiary octylphenol with about 6 to 8 mols of ethylene oxide.
The mixture of finely ground and can then be diluted with water in any desired proportion to form a spray broth ready for use.

B. A spray powder of the following composition was manufactured:
 50 percent of compound No. 12
 25 percent of bolus alba (kaolin)
 20 percent of finely divided silica (product marketed under the trademark HISIL)
 3.5 percent of a condensation product of 1 mol of dodecylmercaptan with 12 mols of ethylene oxide
 1.5 percent of a condensation product of paranonylphenol with 9 mols of ethylene oxide.
The resulting, finely ground mixture can be diluted with water in any desired proportion to form a spray broth ready for use.

EXAMPLE 8

Compound No. 12 is distinguished by its herbicidal activity in the pre-emergence and postemergence methods against mono- and dicotylous plants. Other, similarly constituted carbamates and N-aryl-substituted carbamates act in a similar manner, for example, compounds 20, 25 and 28, when used in an amount within the range of from 1 and 2.5 kg. per hectare.

EXAMPLE 9

The effect of the compounds of this invention against leaf spot fungi was tested on celery (*Apium graveolens* L.) with the fungus *Septoria apii* Chest.

Celery plants were grown in the greenhouse and two days before infection sprayed once with a broth containing 0.1 percent of the active ingredient of the product under test. After infection with an aqueous suspension of spores of *Septoria apii* the plants were incubated in a room having a humid atmosphere at room temperature and then the degree of their infestation, compared with an untreated control specimen (0 percent effect), was determined.

The effect of Compound No. 5 was 100 percent, without phytotoxicity. The following compounds displayed a similar effect: Nos. 1, 2, 3, 10, 16, 17, 23, 24, 26, 27, 30, 31, 34, 37, 38, 41, 43, 44, 45, 47, 49, 86, 107 and 109.

EXAMPLE 10

The effect of the compounds of this invention against leaf spot fungi was confirmed on tomatoes (*Solanum hycopersicum* L.) with the fungus *Alternaria solani* (E. et M.) J. et Gr.

Tomato plants were grown in the greenhouse and 2 days before the infection sprayed once with a broth containing 0.1 percent of the active ingredient of he product under test. After infection with an aqueous suspension of spores of *Alternaria solani* the plants were incubated in a room having a humid atmosphere at room temperature and the degree of their infestation was compared with that of untreated controls (0 percent effect).

Compound No. 48 displayed a 100 percent effect, without phytotoxicity. The following compounds displayed a similar effect: 3, 23, 26, 30, 33, 36, 37, 38 and 96 (systemic).

EXAMPLE 11

The compounds of this invention are distinguished by effects against powdery mildew.

Zucchetti plants (*Cucurbita Pepo L.*) were grown in the greenhouse and given one prophylatic spray with an aqueous broth of the product under test containing 0.1 percent of active substance. Two days after this treatment the plants were infected with spores of *Erysiphe cichoriacearum* DC. and after 12–14 days the degree of fungus infestation was determined.

Compared with the untreated control (0 percent effect) Compound No. 1 79had a 95 percent effect on the sprayed plants, without phytotoxicity. The following preparations had a similar effect: Nos. 4, 10, 19, 20, 26 and 79.

EXAMPLE 12

1-Year improved Jonathans were sprayed 10 times with the solution of the active substance during the vegetation period at 10-day intervals, beginning on May, 17th, 1966. Ten small trees were treated. The spray broth was prepared by dispersing 0.1 percent of the active substance in water. Each plant was Sprayed with 7 litres of the aqueous suspension.

On Sept. 14th,1966 the amount of infestation by *Podosphaera leucotricha* (Ell. et Ev. Salm. was determined by inspecting 200 leaves on each of 5 equally developed plants.

The results in percent are shown in the following table. For comparison, the table further contains the results obtained with a known fungicide against apple mildew, namely 2,4-dinitro-6-(2-octyl)-phenylcrotonate (A):

TABLE

| Substance tested | Concentration % | Infestation % |
| --- | --- | --- |
| Compound No. 1 | 0.1 | 9.1 |
| A | 0.12 | 16 |
| Untreated |  | 46 |

EXAMPLE 13

Compounds 1 and 20 are distinguished by their strong acaricidal effects.

Compounds 17, 20, 26, 33, 59 and 87 having a strong ovicidal effect against T. Kühniella.

EXAMPLE 14

Determining the minimal inhibitory concentration (MIC)

against bacteria and fungi in the dilution test.

The MIC (minimal inhibitory concentration) is determined by a test based upon standard specifications which affords an approximation to the absolute minimal inhibitory values of an active substance.

A solution of 1 percent and 0.3 percent strength each of the active substance in dimethylsulfoxide is introduced into little tubes containing sterile glucose broth and with these solutions dilution series in decades are prepared. By combining the two series the following continuous dilution series is obtained: 1000, 300, 100, 30, 10, 3 p.p.m. etc.

The solution are inoculated with the bacterium *Staphylococcus aureus* and then incubated for 48 hours at 37° C., to determine the bacteriostatic effect.

After the times mentioned, the following minimal inhibitory values in parts per million are obtained:

| Compound No. | MIC in parts per million |
| --- | --- |
| 1 | 1 |
| 2 | 3 |
| 4 | 1 |
| 5 | 1 |
| 10 | 10 |
| 11 | 10 |
| 14 | 10 |
| 20 | 3 |
| 23 | 1 |
| 24 | 3 |
| 27 | 3 |
| 28 | 3 |
| 30 | 1 |
| 37 | 3 |
| 38 | 1 |
| 41 | 1 |
| 44 | 1 |
| 45 | 1 |
| 48 | 10 |
| 109 | 10 |

EXAMPLE 15

The under-mentioned compounds killed off *Australorbis glabratus* completely with a concentration of
No. 69 three parts per million and under
No. 105 three parts per million and under

EXAMPLE 16

The following compounds delayed a strong lethal effect against *Orgyia gonost.*: Nos. 33, 107 and 109.

Compound No. 33 acts also against *Prodenia litura*.

EXAMPLE 17

When used in very low concentrations (100 parts per million or less) compounds 53 and 65 have a very strong lethal effect against *Ripicephalus bursa*.

We claim:

1. A carbamate of the formula

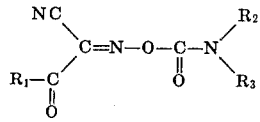

in which $R_1$ represents a member selected from the group consisting of an alkoxy, having from one to 16 carbon atoms, cyclohexyloxy, allyloxy, phenylallyloxy, di-loweralkylamino, phenylamino substituted by at least one of chloro, bromo, trifluoromethyl, lower alkyl and nitro $R_2$ represents a hydrogen atom or lower alkyl and $R_3$ is hydrogen, lower alkyl, chloroethyl, unsubstituted phenyl or substituted by at least one of chloro, bromo, trifluoromethyl, methyl, isobutoxy, and nitro.

2. A carbamate as claimed in claim 1 in which $R_3$ is lower alkyl, chloroethyl, unsubstituted phenyl or substituted by at least one of chloro, bromo, trifluoromethyl, methyl, isobutoxy and nitro.

3. A carbamate as claimed in claim 1 in which $R_1$ is phenylamino substituted by at least one of chloro, bromo, nitro, trifluoromethyl and alkyl of at most four carbon atoms.

4. A carbamate as claimed in claim 1 wherein $R_1$ is methoxy, ethoxy or cyclohexyloxy, $R_2$ is hydrogen and $R_3$ is phenylamino substituted by at least one and not more than two of chloro and trifluoromethyl.

5. A carbamate as claimed in claim 1 having the formula

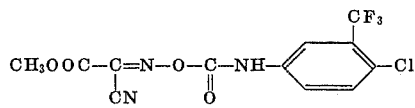

6. A carbamate as claimed in claim 1 having the formula

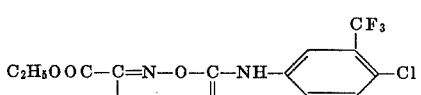

7. A carbamate as claimed in claim 1 having the formula

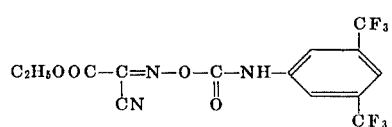

8. A carbamate as claimed in claim 1 having the formula
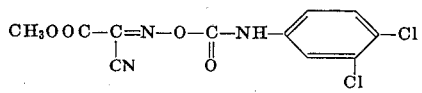
9. A carbamate as claimed in claim 1 having the formula
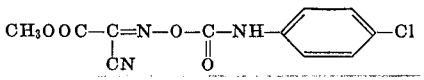
10. A carbamate as claimed in claim 1 having the formula
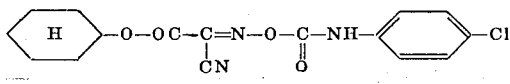
11. A carbamate as claimed in claim 1 having the formula
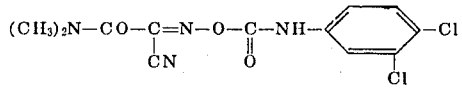
* * * * *